United States Patent [19]
Hashimoto et al.

[11] Patent Number: 5,841,257
[45] Date of Patent: Nov. 24, 1998

[54] CIRCUIT FOR SUPPLYING/INTERRUPTING POWER TO ROBOTS

[75] Inventors: Yoshiki Hashimoto, Hadano; Yasuyuki Shimoda; Yasuhiro Matsuo, both of Minamitsuru-gun, all of Japan

[73] Assignee: Fanuc, Ltd., Minamitsuru-gun, Japan

[21] Appl. No.: 592,446

[22] Filed: Jan. 26, 1996

Related U.S. Application Data

[63] Continuation of Ser. No. 185,950, filed as PCT/JP93/00640, May 14, 1993 published as WO93/24284, Dec. 9, 1993, abandoned.

[51] Int. Cl.[6] ........................................... B25J 9/18
[52] U.S. Cl. ................. 318/568.11; 318/568.12; 318/575; 318/473; 318/434; 395/80; 395/83; 395/91
[58] Field of Search .................. 318/568.11, 568.12, 318/575, 473, 434; 395/80, 83, 91

[56] References Cited

U.S. PATENT DOCUMENTS

| | | | |
|---|---|---|---|
| 3,906,313 | 9/1975 | Danis et al. | 318/473 |
| 4,357,565 | 11/1982 | Saito et al. | 318/473 |
| 4,682,089 | 7/1987 | Tamari | 318/568 |
| 4,795,957 | 1/1989 | MacNeal, Jr. | 318/568 |
| 5,028,854 | 7/1991 | Moline | 318/434 |
| 5,115,176 | 5/1992 | White et al. | 318/473 |

FOREIGN PATENT DOCUMENTS

| | | |
|---|---|---|
| 0465710 | 1/1992 | European Pat. Off. . |
| 0474881 | 3/1992 | European Pat. Off. . |
| 55-52774 | 12/1980 | Japan . |
| 59-173811 | 10/1984 | Japan . |
| 60-80581 | 5/1985 | Japan . |
| 61-151917 | 7/1986 | Japan . |

*Primary Examiner*—Karen Masih
*Attorney, Agent, or Firm*—Staas & Halsey

[57] ABSTRACT

A circuit for supplying/interrupting power to robots in a robot control system which controls two robots by use of one controller. This circuit for supplying/interrupting power to robots includes a common power interrupting circuit, which simultaneously interrupts power supplies to two robots, and power interrupting circuits for individual robots, which individually interrupt power supplies to individual robots. When a common cutoff switch circuit in the common power interrupting circuit is operated on the basis of an emergency stop signal or an alarm signal, two relays are deenergized at the same time, thereby simultaneously interrupting power supply to two robots. When one of the cutoff switch circuits in the power interrupting circuit for each robot is operated by an emergency stop signal or an alarm signal, only one corresponding relay is deenergized, thereby interrupting power supply to one appropriate robot.

8 Claims, 2 Drawing Sheets

1

CIRCUIT FOR SUPPLYING/INTERRUPTING POWER TO ROBOTS

This application is a continuation of application Ser. No. 08/185,950, filed as PCT/JP93/00640, May 14, 1993 published as WO93/24284, Dec. 9, 1993, now abandoned.

TECHNICAL FIELD

The present invention relates to a circuit for supplying or interrupting power to robots, which constitute a robot control system designed for controlling two robots by means of a single controller.

BACKGROUND ART

For the conventional industrial robots, a controller is provided to each robot, and an emergency stop command from a manual operating panel, a teaching panel, peripheral devices, or the like or various alarms, internally generated by the controller, are used to interrupt power to the robot so that the robot is stopped in emergency.

Recently, a system has been developed in which two robots (manipulators) are controlled by a single controller. For two robots constituting such a robot control system, however, an emergency stop means fully meeting various requirements such as those for the installation condition, operating condition, and work efficiency of robots to be controlled by the control system which have not been provided.

DISCLOSURE OF THE INVENTION

An object of the present invention is to provide a circuit for supplying/interrupting power to a robot control system controlling two robots by means of a single control system, in which an emergency stop means fully adapted to the operational characteristics of the control system is taken for the robots constituting that robot control system.

To achieve the above object, according to one mode of the present invention, a circuit for supplying/interrupting power to robots in a robot control system, which controls two robots by one controller, comprises a common power interrupting circuit, which simultaneously interrupts power to two robots, and power interrupting circuits for individual robots which individually interrupt powers to individual robots.

According to another mode of the present invention, a circuit for supplying/interrupting power to robots in a robot control system, which controls two robots by means of one controller, comprises power interrupting circuits for individual robots which individually interrupt powers to individual robots.

Preferably, the aforesaid circuit for supplying/interrupting power to robots includes a relay and a cutoff switch circuit for energizing or deenergizing the relay, so that power supply to the servo amplifier for each axis of a robot is interrupted by operating the cutoff switch circuit to turn off the relay contact.

Further, according to another mode of the present invention, a circuit for supplying/interrupting power to robots in a robot control system, which controls two robots by means of one controller, comprises a common power interrupting circuit, which simultaneously interrupts powers to two robots, and a relay corresponding to the relay contact of the common power interrupting circuit is connected to an emergency stop signal generating means installed on each robot.

Further, according to another mode of the present invention, a circuit for supplying/interrupting power to robots in a robot control system, which controls two robots by means of one controller, comprises a common power interrupting circuit, which simultaneously interrupts powers to two robots, and a relay corresponding respectively to two or more relay contacts connected in series in the common power interrupting circuit are connected to at least two of an emergency stop command signal generating means of peripheral device installed for each robot, an emergency stop command switch installed on a teaching panel, and an emergency stop command switch installed on a manual operating panel of the controller.

Further, according to another mode of the present invention, a circuit for supplying/interrupting power to robots in a robot control system, which controls two robots by means of one controller, comprises a common power interrupting circuit which includes one or more series-connected relay contacts and simultaneously interrupts power to two robots, and power interrupting circuits for individual robots, which include one or more series-connected relay contacts and individually interrupt powers to individual robots; to a relay corresponding to the relay contact in the common power interrupting circuit are connected one or more types of emergency stop command switches; and to a relay corresponding to the relay contact in the power interrupting circuit for each robot are connected one or more types of emergency stop command switches different from the above type of emergency stop command switch.

Preferably, one or more types of emergency stop command signal generating means of peripheral device installed for each robot, an emergency stop command switch installed on a teaching panel, and an emergency stop command switch installed on a manual operating panel of the controller are connected to a relay corresponding to the relay contact in the common power interrupting circuit, and one or more types of the remainder are connected to a relay corresponding to the relay contact in the power interrupting circuit for each robot.

As described above, according to the present invention, the circuit for supplying/interrupting power to robots, which is used for emergency stop in a robot control system for controlling two robots by a single controller, can be selected according to the characteristics of the control system, for example, a characteristic such that the control system must consider the safety of robot operation with first priority, or a characteristic such that the control system must restrain the decrease in work efficiency of robot as much as possible since the safety does not present a problem.

BEST MODE FOR CARRYING OUT THE INVENTION

In a robot control system for controlling two robots by a single controller, when either of two robots constituting the control system receives an emergency stop command, as one measure, only the robot which has received the command is stopped and another robot continues operating, or, as another possible measure, both robots are stopped at the same time.

For example, there may be a case where two adjacent robots are disposed close to each other. When an operator approaches one robot for teaching the operation to that robot, the operator enters the working area of the other robot. In such a case, if one robot must be stopped in emergency, it is preferred to stop the other robot, too.

On the other hand, there may be another case where two robots are disposed at a large interval therebetween that even when an operator enters the working area of one robot, for example, for teaching, there is little chance for the operator to enter the working area of the other robot. In such a case, even when one robot is stopped, it is not necessary to stop the other robot, and there is no safety problem, it is sometimes better not to interrupt the operation of the robots in order not to invite any further decrease of work efficiency.

Also, regardless of the distance between robots, there is a case where it is preferable to have one robot stopped, while the other is kept operating, or there is a case where it is better to stop both robots, depending on the type of stop command or the type of alarm.

Thus, in a robot control system for controlling two robots by a single controller, a power supplying/interrupting circuit of an appropriate constitution is needed depending on the state of the system or the operating condition of the robot in order to stop the robot constituting the control system in emergency.

Therefore, concerning a robot control system for controlling two robots by a single controller, some examples of power supplying/interrupting circuit for stopping the robot in emergency depending on the state of the control system will be presented below.

First, a first embodiment of the present invention will now be described with reference to FIG. 1. In this first embodiment, two robots can selectively be stopped either simultaneously or singly by a command or an alarm.

Figure 1:
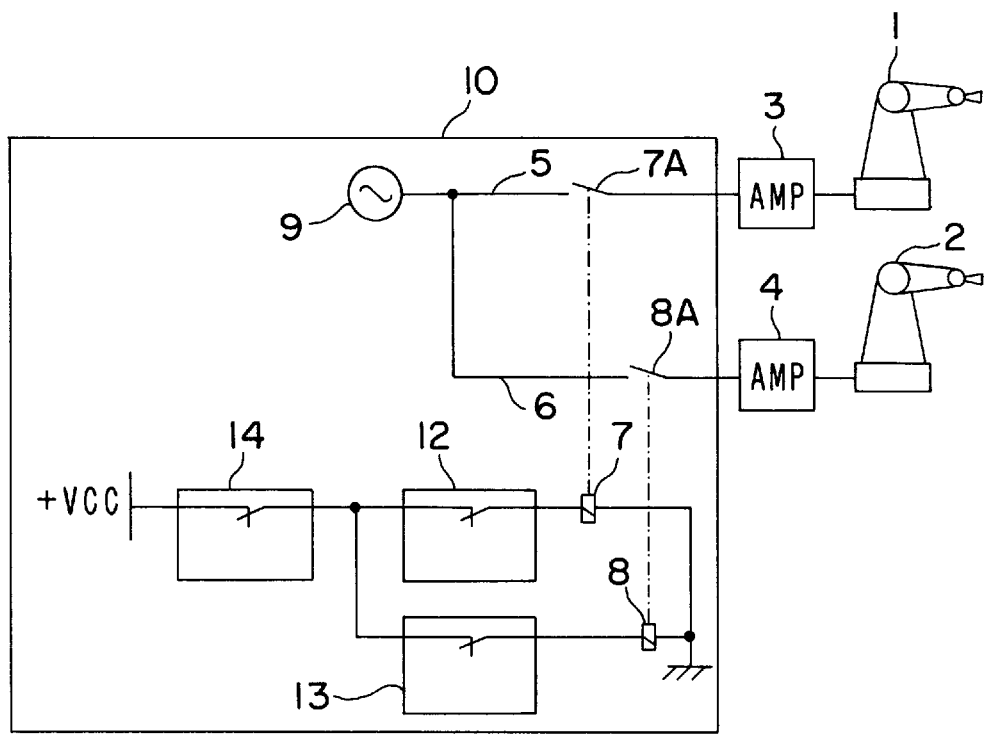
FIG. 1 is a block diagram of a power interrupting circuit of robot showing a first embodiment of the present invention.

FIG. 1 is a block diagram of the main portion of a power supplying/interrupting circuit in a system for controlling two robots (manipulators) 1 and 2 by one controller. In FIG. 1, servo amplifiers 3 and 4 of servo motors (not shown) for driving axes of robots 1 and 2 (a servo amplifier is installed for each servo motor of each axis, but only one servo amplifier is shown for each robot in the figure) are respectively connected to a power source 9 by power supply lines 5 and 6 via contacts 7A and 8A of relays 7 and 8, which will be described later.

The relay 7 is connected to a power source Vcc for control via a cutoff switch circuit 12 for robot 1 and a common cutoff switch circuit 14. The relay 8 is connected to a power source Vcc for control via a cutoff switch circuit 13 for robot 2 and a common cutoff switch circuit 14.

When the switch for starting the operation of robots is turned on at the controller 10, the relays 7 and 8 are energized via the common cutoff switch circuit 14 and the cutoff switches 12 and 13 for robot 1 and robot 2, respectively, whereby the relay contacts 7A and 8A are turned on. As a result, power is supplied to the servo amplifier 3 and 4 from the power source 9.

In order to stop two robots 1 and 2 at the same time, the common cutoff switch circuit 14 is operated, and the relays 7 and 8 are deenergized by turning off power supply to two relays 7 and 8. As a result, the relay contacts 7A and 8A are turned off to stop the power supply to the servo amplifier 3 and 4, and both the robot 1 and the robot 2 stop their operation. When only the robot 1 is operated and the robot 2 is stopped, the cutoff switch circuit 13 for robot 2 is operated to deenergize the relay 8 only and turn off the relay contact 8A, so that power supply to the servo amplifier 4 for each axis of the robot 2 is interrupted to stop the operation of robot 2, while the robot 1 remains in operation. When only the robot 2 has to be operated, while the robot 1 is stopped, the cutoff switch circuit 12 for robot 1 is operated to deenergize the relay 7 so that the relay contact 7A is turned off, whereby the power supply to the servo amplifier 3 for each axis of the robot 1 is interrupted to stop the operation of robot 1.

As described above, according to this embodiment, both robots can be stopped at the same time, or only either of the two robots can also be stopped. Specifically, the operation of robots can selectively be stopped by operating the common cutoff switch circuit 14 or the cutoff switch circuits 12 and 13 for each robot depending on the type of an emergency stop command or an alarm.

Next, the power supplying/interrupting circuit in accordance with a second embodiment of the present invention will be described. In the second embodiment, like the first embodiment, two robots can be stopped at the same time, or only either of the two robots can also be stopped. This embodiment is the same as the first embodiment shown in FIG. 1, except that the common cutoff switch circuit 14 is not installed in the controller 15. Therefore, in FIG. 2, like reference numerals are applied to the like elements shown in FIG. 1.

Specifically, the controller comprises a cutoff switch circuit 12 for robot 1, which controls a relay 7 for interrupting power supply to a servo amplifier 3 for each axis of the robot 1 by means of a contact 7A, and a cutoff switch circuit 13 for robot 2, which controls a relay 8 for interrupting power supply to a servo amplifier 4 for each axis of the robot 2 by means of a contact 8A.

Thus, when only the robot 1 has to be stopped, the cutoff switch circuit 12 for robot 1 is operated to deenergize the relay 7 so that the relay contact 7A is turned off, whereby power supply to the servo amplifier for each axis of the robot 1 is interrupted. When only the robot 2 has to be stopped, the cutoff switch circuit 13 for robot 2 is operated to deenergize the relay 8 so that the relay contact 8A is turned off, whereby the power supply to the servo amplifier for each axis of the robot 2 is interrupted to stop the operation of the robot 2.

In order to stop both robots, the cutoff switch circuit 12 for robot 1 and the cutoff switch circuit 13 for robot 2 are operated simultaneously. In the second embodiment shown in FIG. 2, although the common cutoff switch circuit 14 in the first embodiment is not provided, the same effect as that of the common cutoff switch circuit 14 in the first embodiment can be obtained by simultaneously operating the cutoff switch circuits 12 and 13 for robots 1 and 2.

In the above first and second embodiments, when an alarm inherent in each robot such as the overtravel or the break of a hand has occurred, or when only one robot has to be stopped in an emergency, one cutoff switch circuit corresponding to the cutoff switch circuit 12 for robot 1 or the cutoff switch circuit 13 for robot 2 is operated to stop the corresponding robot only. When an alarm common to two robots is generated, or when both robots have to be stopped at the same time, both robots can be stopped by operating the common cutoff switch circuit 14 in the first embodiment, or by operating the cutoff switch circuits 12 and 13 for robots 1 and 2 at the same time in the second embodiment.

Next, a power supplying/interrupting circuit in accordance with a third embodiment of the present invention will be described with reference to the block diagram of FIG. 3. This third embodiment is designed essentially for stopping the two robots 1 and 2 on the basis of an emergency stop command. In this embodiment the emergency stop command is received from a teaching panel of each robot, a manual operating panel of controller, and a peripheral device provided for each robot. A power supplying/interrupting circuit in a controller 40 is composed of relays only.

Figure 3:
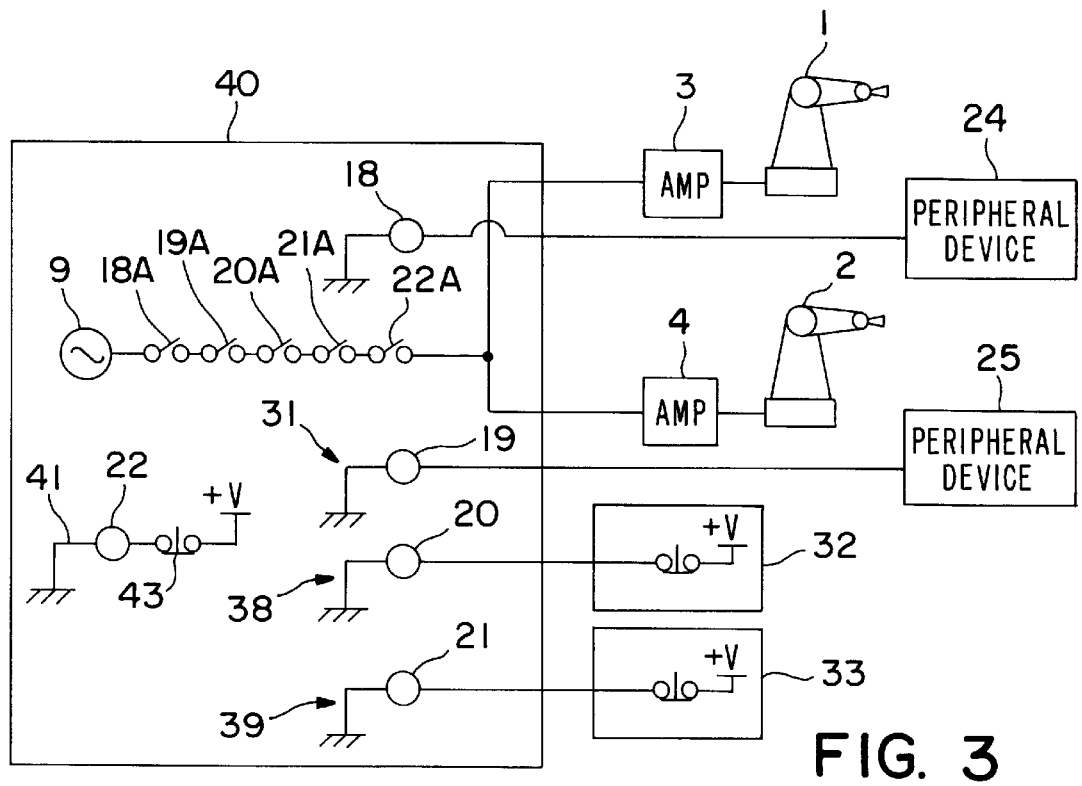
FIG. 3 is a block diagram of a power interrupting circuit of robot showing a third embodiment of the present invention.

In FIG. 3, an emergency stop command signal (alarm) from a peripheral device 24 disposed in association with the robot 1 is inputted to a relay 18 provided in the controller 40 to deenergize the relay 18. Likewise, an emergency stop command signal (alarm) from a peripheral device 25 disposed in association with the robot 2 deenergize a relay 19 provided in the controller 40.

Also, relays 20 and 21 are activated by a signal from an emergency stop command switch provided on the teaching panel 32 and another device 33, respectively. An emergency stop command switch 43 disposed on the manual operating panel of the controller 40 deenergizes a relay 22.

The contacts 18A to 22A of relays 18 to 22 are connected in series so that power is supplied from a power source 9 to servo amplifiers 3 and 4 for driving a servo motor for each axis of the robot 1 and 2 via the relay contacts 18A to 22A connected in series.

With this configuration, when the power source is turned on, but an emergency stop command signal is not generated from the peripheral device 24 or 25, the teaching panel 32, the other device 33, or the emergency stop command switch 43, the relays 18 to 22 are in an energized state, so that power is supplied to the servo amplifiers 3 and 4 via the relay contacts 18A to 22A. As a result, the robots 1 and 2 are in an operable state, and are operated according to respective teaching programs. On the other hand, when an emergency stop command is issued from the peripheral device 24 or 25, or when an emergency stop switch of the teaching panel 32, the other device 33 or the controller 40 are activated, one of the relays 18 to 22 is deenergized, so that one of the contacts 18A to 22A is turned off. As a result, power supply to the servo amplifiers 3 and 4 is interrupted, thereby causing both the robots 1 and 2 to be stopped. As described previously, this third embodiment is applied to the case where the robots 1 and 2 are disposed close to each other so that it is dangerous to keep any one robot operating while the other robot is stopped.

Next, a power supplying/interrupting circuit in accordance with a fourth embodiment of the present invention will be described with reference to FIG. 4. In this fourth embodiment, either both robots or only one of the robots is stopped depending on the equipment generating an emergency stop command. The power supplying/interrupting circuit in a controller 40 is composed of relays only, like the third embodiment of FIG. 3.

Figure 4:
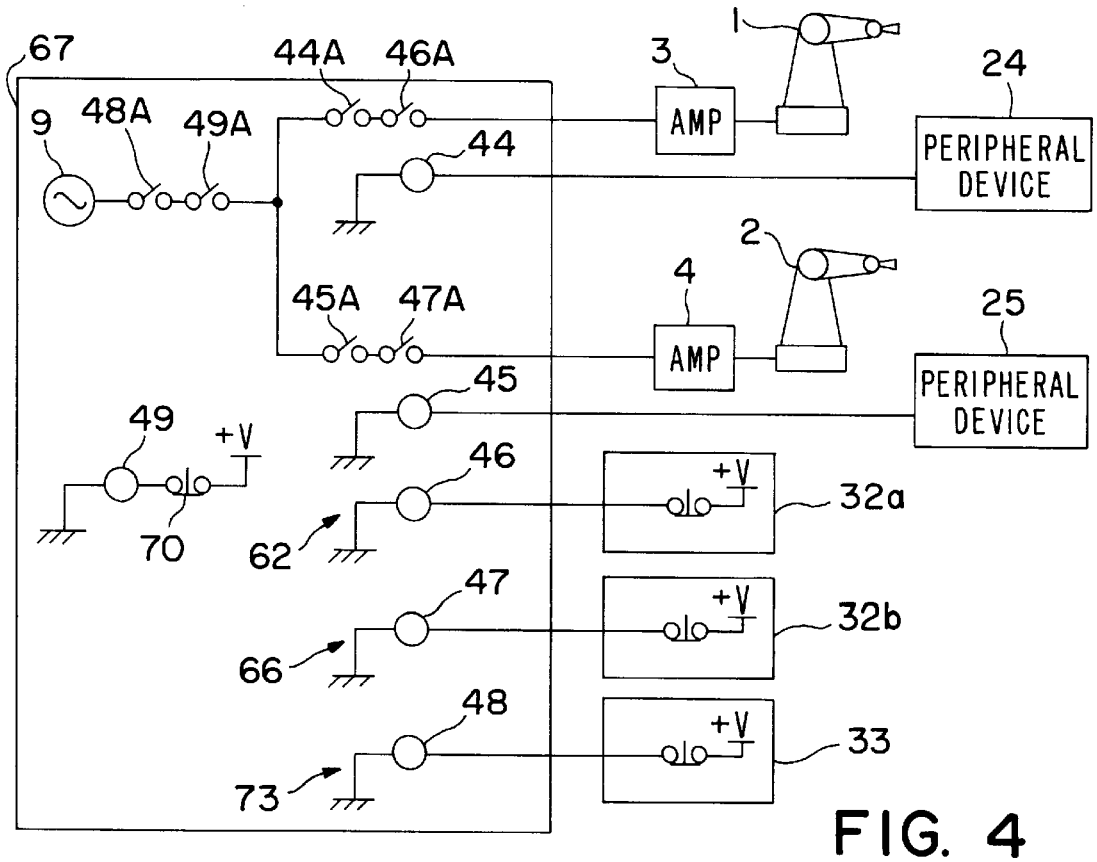
FIG. 4 is a block diagram of a power interrupting circuit of robot showing a fourth embodiment of the present invention.

In FIG. 4, an emergency stop command signal (alarm) from a peripheral device 24 disposed for the robot 1 is inputted to a relay 44 disposed in the controller 67 for controlling two robots 1 and 2 to deenergize the relay 44. Likewise, an emergency stop command signal (alarm) from a peripheral device 25 disposed for the robot 2 deenergizes a relay 45. A signal from a common emergency stop command switch for both robots 1 and 2 disposed on a teaching panel 32a for robot 1, a teaching panel 32b for robot 2, and another device 33 deenergizes relays 46, 47 and 48, respectively. Further, an emergency stop command switch 70 disposed on a manual operating panel in the controller 67 deenergizes a relay 49.

A servo amplifier 3 for driving a servo motor for each axis of the robot 1 is connected to a power source 9 via contacts 48A, 49A, 44A and 46A of the relays 48, 49, 44 and 46, whereas a servo amplifier 4 for driving a servo motor for each axis of the robot 2 is connected to the power source 9 via contacts 48A, 49A, 45A and 47A of the relays 48, 49, 45 and 47.

When an emergency stop command or an alarm is not generated, and the relays 44 to 49 are in an energized state, the relay contacts 44A to 49A are in ON condition, and the servo amplifiers 3 and 4 are connected to the power source. However, if an emergency stop command is outputted from the peripheral device 24 of the robot 1, or if the emergency stop command switch on the teaching panel 32a for the robot 1 is activated, the relay 44 or the relay 46 is deenergized, so that the contact 44A or 46A is turned off. As a result, power supply to the servo amplifier 3 is interrupted, thereby stopping the robot 1. If an emergency stop command is outputted from the peripheral device 25 of the robot 2, or if the emergency stop command switch on the teaching panel 32b for the robot 2 is activated, the relay 45 or the relay 47 is deenergized, so that the contact 45A or 47A is turned off. As a result, power supply to the servo amplifier 4 is interrupted, thereby stopping the robot 2. Further, if the emergency stop command switch 70 on the manual operating panel of the controller 67 is activated, or if the emergency stop command switch for both robots 1 and 2 which is installed on the other device 33 is activated, the relay 49 or 48 is deenergized, so that the contact 49A or 48A is turned off. As a result, power supply to both the servo amplifiers 3 and 4 for the robots 1 and 2 is interrupted, thereby stopping the robots 1 and 2.

As described above with reference to the embodiments, except the case of the third embodiment, the robot control system for controlling two (or more) robots by a single controller is designed for being capable of stopping any one specific robot, as well as for being capable of stopping all the rest of the robots simultaneously with any one specific robot, thereby making selectively available two different methods for stopping the operation of the robots.

Next, the modifications of the above first, second and fourth embodiments, in which two different methods for stopping the operation of the robot can be selected, will be described below.

For the first embodiment, a plurality of terminals for operating the cutoff switch circuits 12 and 13 for each robot and the common cutoff switch circuit 14 shown in FIG. 1 are installed, and these terminals are selectively connected so that an emergency stop command or an alarm signal is inputted to each switch circuit to cause it to operate. A stop command signal or an alarm can be inputted by selecting the above terminal depending on the position of the robots 1 and 2 or other conditions such as whether only one robot should be stopped or two robots should be stopped at a time.

Figure 2:
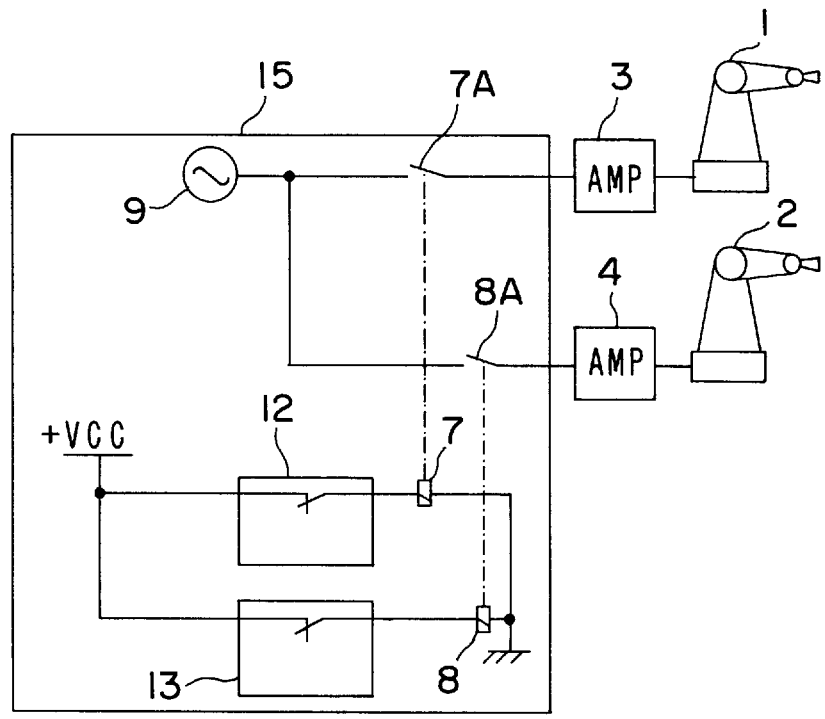
FIG. 2 is a block diagram of a power interrupting circuit of robot showing a second embodiment of the present invention.

For the second embodiment, a plurality of input terminals for operating the cutoff switch circuits 12 and 13 shown in FIG. 2 are installed so that an emergency stop command signal or an alarm signal is inputted to either one of the cutoff switch circuits 12 and 13 or both to stop only one robot or both robots according to the system configuration.

For the fourth embodiment, a plurality of input terminals for operating a relay 48 or 49 for stopping both the robots 1 and 2 shown in FIG. 4, or a plurality of input terminals for operating the relay 44, 46 or the relay 45, 47 for stopping only one robot, are installed so that an emergency stop command signal or an alarm signal is inputted by selecting the input terminal. Thus, arbitrary selection can be made for stopping either one robot or both robots according to the system configuration.

We claim:

1. A circuit for supplying/interrupting power to robots in a robot control system for controlling robots using a single controller, each of said robots coupled to said single controller, said circuit comprising:

power supply means for supplying power to said robots;

a common power interrupting circuit, coupled between said robots and said power supply means, which simultaneously interrupts the power being supplied to said robots; and a plurality of power interrupting circuits, each power interrupting circuit of said plurality of power interrupting circuits corresponding to a respective robot of said robots, each said power interrupting circuit individually interrupting the power supplied to the corresponding and respective robot.

2. A circuit for supplying/interrupting power to robots according to claim 1, wherein said circuit for supplying/interrupting power to robots further comprises:

relay contacts installed between the power supply means and servo amplifiers, each relay contact installed between the power supply means and a corresponding servo amplifier for a corresponding and respective robot;

relays, each relay corresponding to a respective relay contact of said relay contacts; and cutoff switch circuits for energizing or deenergizing said relays, each cutoff switch circuit corresponding to a respective relay, and each cutoff switch interrupting the power being supplied to the corresponding servo amplifier of the servo amplifiers for each axis of the robot when operated, causing the power supplied to said respective relay and said respective relay contact to be turned off.

3. A circuit for supplying/interrupting power to robots in a robot control system for controlling robots by a single controller, comprising power interrupting circuits, each power interrupting circuit of said power interrupting circuits coupled to a corresponding robot of said robots, each said power interrupting circuits individually interrupting power supplied to the corresponding robot of said robots.

4. A circuit for supplying/interrupting power to robots according to claim 10, wherein said circuit for supplying/interrupting power to robots further comprises:

relay contacts installed between a power source and servo amplifiers, each relay contact installed between the power source and a corresponding servo amplifier for a corresponding robot of the robots;

relays, each relay corresponding to a respective relay contact of said relay contacts; and cutoff switch circuits for energizing or deenergizing said relays, each cutoff switch circuit corresponding to a respective relay, and each cutoff switch interrupting the power supplies to a respective servo amplifier for each axis of the corresponding robot when operated, causing the power supplies to said respective relay and said respective relay contact to be turned off.

5. A circuit for supplying/interrupting power to robots in a robot control system for controlling robots using one controller, comprising:

power supply means for supplying power to said robots;

a common power interrupting circuit coupled between said robots and said power supply means, which simultaneously interrupts power being supplied to said robots, said common power interrupting circuit comprising:

relay contacts, coupled between the power supply means and servo amplifiers, each relay contact of the relay contacts coupled between the power supply means and a respective servo amplifier, each servo amplifier coupled to a respective robot of said robots, and relays, each relay corresponding to a respective relay contact of said relay contacts and each relay coupled to a respective emergency stop signal generating means associated with a respective robot, so that the power supplied to the robots is simultaneously interrupted by operating any of said respective emergency stop signal generating means and the respective relay contact is turned off.

6. A circuit for supplying/interrupting power to robots in a robot control system for controlling robots by one controller, comprising:

a common power interrupting circuit, which simultaneously interrupts power supplies to robots, said common power interrupting circuit comprising:

a plurality of relay contacts, each relay contact coupled in series between a power source and a servo amplifier of a corresponding robot of said robots; and relays, which correspond to a respective relay contact of the plurality of relay contacts, each said relay connected to at least two of a corresponding emergency stop command signal generating means of a peripheral device associated with the corresponding robot, a first emergency stop command switch installed in a teaching panel, and a second emergency stop command switch installed on a manual operating panel of the one controller, such that power supplied to each of the robots is simultaneously interrupted by operating one of said emergency stop command signal generating means and either of said first or second emergency stop command switches corresponding to any robot of said robots, causing one relay contact of the corresponding relay contacts to be turned off.

7. A circuit for supplying/interrupting power to robots in a robot control system for controlling robots by one controller, comprising:

a common power interrupting circuit which simultaneously interrupts power supplies to the robots, and power interrupting circuits, each power interrupting circuit corresponding to an individual robot of the robots, each power interrupting circuit individually interrupting the power supplies to the corresponding individual robot, said common power interrupting circuit comprising:

one or more common circuit relay contacts, connected, in series, and coupled to one side of a power source;

common circuit relays, each common circuit relay corresponding to a respective first relay contact of said common circuit relay contacts, said common circuit relays being connected to at least one emergency stop command switch of a first group, and each said power interrupting circuit comprising:

series-connected relay contacts, each series-connected relay contact coupled between a respective relay contact of said common power interrupting circuit and a servo amplifier corresponding to a respective robot; and relays, which correspond to said series-connected relay contacts and are connected to at least one emergency stop command switch of a second group, said second group being different from said first group of the emergency stop command switch, the power supplies to the robots being simultaneously interrupted or the power supplies to only one robot of the robots being interrupted or the power supplies to only one robot of the robots being interrupted depending on whether the at least one emergency stop command switch is of the first group or the second group, when one of said emergency stop command switches is activated, to cause a respective common circuit relay contact in said common power interrupting circuit to interrupt the power supplies to all of the robots or the respective relay contact in said power interrupting circuit for interrupting the power supplies to the respective robot.

8. A circuit for supplying/interrupting power to robots according to claim 7, wherein at least one of an emergency stop command signal generating means of a peripheral device associated with each robot, an emergency stop command switch installed on a teaching panel, and an emergency stop command switch installed on an operating panel of the controller, is connected to a respective relay of said relays corresponding to the respective relay contact in said common power interrupting circuit, and said emergency stop command signal generating means of the peripheral device associated with each robot, said emergency stop common switch installed on the teaching panel and said emergency stop command switch installed on the operating panel of the controller not connected to the respective relay of said relays corresponding to the respective relay contact in the common power interrupting circuit, are connected to the respective relay contacts in said power interrupting circuit for each robot.

* * * * *